US012811811B2

(12) United States Patent
Jujavarapu et al.

(10) Patent No.: US 12,811,811 B2
(45) Date of Patent: Nov. 24, 2026

(54) ACCESS TO A TERMINAL

(71) Applicant: Ford Global Technologies, LLC, Dearborn, MI (US)

(72) Inventors: Venkata Sandeep Jujavarapu, Dearborn, MI (US); Scott Turik, Oakland, MI (US); Yuan Zhang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

(21) Appl. No.: 18/658,113

(22) Filed: May 8, 2024

(65) Prior Publication Data

US 2025/0350479 A1 Nov. 13, 2025

(51) Int. Cl.
*H04L 9/32* (2006.01)

(52) U.S. Cl.
CPC .................................. *H04L 9/3265* (2013.01)

(58) Field of Classification Search
None
See application file for complete search history.

(56) References Cited

U.S. PATENT DOCUMENTS 8,078,866 B2 * 12/2011 Xiao ..................... H04L 9/3265 713/157
2010/0161482 A1 6/2010 Litterll
2016/0352521 A1 * 12/2016 Choi ..................... H04L 9/3247
2022/0069602 A1 3/2022 Shin
2022/0141210 A1 * 5/2022 Tylik ................... G06F 9/45558 713/157
2023/0396451 A1 * 12/2023 Roman Cuesta ... H04L 63/0823
2024/0010095 A1 * 1/2024 Shin ......................... B60L 53/34
2024/0031176 A1 * 1/2024 Yamada ................ H04L 9/3265
2025/0063038 A1 * 2/2025 Cielas ................... H04L 9/3268

FOREIGN PATENT DOCUMENTS

KR 20220074784 A 6/2022
KR 20220110062 A 8/2022

OTHER PUBLICATIONS

Multin, M., "ISO 15118's feature for a more user-convenient and secure way of charging electric vehicles," The Basics of Plug & Charge, Nov. 15, 2020, 8 pages.

* cited by examiner

*Primary Examiner* — Trang T Doan
(74) *Attorney, Agent, or Firm* — Christopher Storms; Brooks Kushman P.C.

(57) ABSTRACT

Upon requesting access to a terminal, a mobile computer receives a communication certificate chain from a terminal computer included in the terminal. The mobile computer establishes a communication session with the terminal computer based on an issuer identifier associated with a root certificate in the communication certificate chain matching a stored issuer identifier. Upon establishing the communication session, the mobile computer determines, for each of a plurality of access certificate chains, a respective issuer identifier associated with a respective root certificate in the corresponding access certificate chain. Upon determining that the respective issuer identifier in one access certificate chain matches the stored issuer identifier, the mobile computer selects the one access certificate chain. The mobile computer transmits the selected access certificate chain to the terminal computer.

22 Claims, 7 Drawing Sheets

200

ACCESS TO A TERMINAL

Various entities may support terminals, including terminal computers that permit authorized vehicles to access the terminal to receive objects or services provided by the terminal. A terminal computer may utilize a Key Infrastructure (PKI) to identify mobile computers that are authorized to access the terminal.

DESCRIPTION

Figure 1:
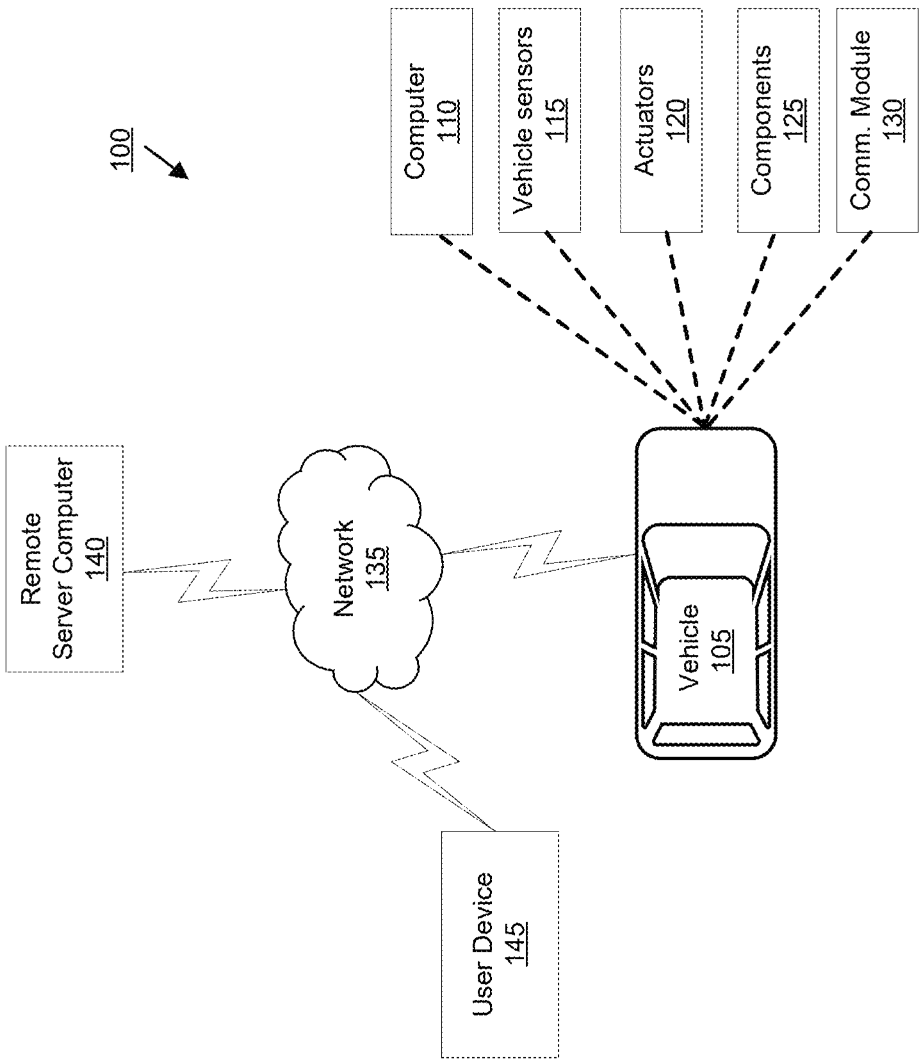
FIG. 1 is a block diagram of a charging station system.

A system includes a mobile computer including a processor and a memory, the memory storing instructions executable by the processor such that the mobile computer is programmed to, upon requesting access to a terminal, receive a communication certificate chain from a terminal computer included in the terminal. The mobile computer is further programmed to establish a communication session with the terminal computer based on an issuer identifier of a root certificate authority in the communication certificate chain matching a subject identifier of a stored root certificate. The mobile computer is further programmed to, upon establishing the communication session, determine, for each of a plurality of access certificate chains, a respective issuer identifier of a respective root certificate authority in the corresponding access certificate chain. The mobile computer is further programmed to, upon determining that the respective issuer identifier in one access certificate chain matches the subject identifier of the stored root certificate, select the one access certificate chain. The mobile computer is further programmed to transmit the selected access certificate chain to the terminal computer.

The mobile computer may be further programmed to, upon determining that the issuer identifier of the root certificate authority in the communication certificate chain does not match the subject identifier of the stored root certificate, prevent establishment of the communication session.

The system can further include the terminal computer, including a second processor and a second memory storing instructions executable by the second processor such that the terminal computer is programmed to, upon receiving authorization from a third computer, permit the mobile computer to access the terminal. The mobile computer may be included in a vehicle, and the third computer may be remote from the vehicle and the terminal.

The system can further include the third computer, including a third processor and a third memory storing instructions executable by the third processor such that the remote computer is programmed to, generate the authorization in response to receiving a specified number of tokens from a fourth computer.

The system can further include the terminal computer, including a second processor and a second memory storing instructions executable by the second processor such that the terminal computer is programmed to, upon receiving the selected access certificate chain, authenticate the selected access certificate chain based on the respective issuer identifier included in the selected access certificate chain matching the issuer identifier of the root certificate authority in the communication certificate chain. The terminal computer can be further programmed to, then, upon identifying a subject identifier from an end-user certificate in the selected access certificate chain, transmit the subject identifier to a third computer. The terminal computer can be further programmed to, upon receiving authorization from the third computer, permit the mobile computer to access the terminal. The mobile computer may be included in a vehicle, and the third computer may be remote from the vehicle and the terminal.

The mobile computer may be further programmed to, upon determining that none of the respective issuer identifiers included in the respective access certificate chains match the subject identifier of the stored root certificate, determine, for each of the access certificate chains, a respective subject identifier included in a respective end-user certificate. The mobile computer may be further programmed to compare each of the respective subject identifiers included in the respective end-user certificates to a subject identifier included in an intermediate certificate of the communication certificate chain. The intermediate certificate is issued by a root certificate authority. The mobile computer may be further programmed to, upon determining that the respective subject identifier in the respective end-user certificate of one access certificate chain matches the subject identifier in the intermediate certificate, select the one access certificate chain. The mobile computer may be further programmed to transmit the selected access certificate chain to the terminal computer.

The mobile computer may be further programmed to, upon determining that at least two of the respective issuer identifiers included in the respective access certificate chains match the subject identifier of the stored root certificate, compare respective subject identifiers included in respective intermediate certificates of the respective access certificate chains to each other. Each of the intermediate certificates are issued by a respective root certificate authority in the respective access certificate chain. The mobile computer may be further programmed to, upon determining that the respective subject identifiers included in the respective intermediate certificates match each other, determine, for each of the corresponding access certificate chains including the at least two respective issuer identifiers, a respective subject identifier included in a respective end-user certificate. The mobile computer may be further programmed to compare each of the respective subject identifiers included in the respective end-user certificates to a subject identifier included in an intermediate certificate of the communication certificate chain. The intermediate certificate is issued by a root certificate authority. The mobile computer may be further programmed to, upon determining that the subject identifier in the end-user certificate of one access certificate chain matches the subject identifier in the intermediate certificate of the communication certificate chain, select the one access certificate chain. The mobile computer may be further programmed to transmit the selected access certificate chain to the terminal computer.

The mobile computer may be further programmed to, upon determining that the at least two respective issuer identifiers do not match each other, determine a subject identifier included in an intermediate certificate of the communication certificate chain. The intermediate certificate is issued by a root certificate authority in the communication certificate chain. The mobile computer may be further programmed to compare respective subject identifiers included in respective intermediate certificates of the respective access certificate chains to the subject identifier included in the intermediate certificate of the communication certificate chain. The mobile computer may be further programmed to select one of the access certificate chains based on the subject identifier included in the intermediate certificate of the corresponding access certificate chain matching the subject identifier included in the intermediate certificate of the communication certificate chain. The mobile computer may be further programmed to transmit the selected access certificate chain to the terminal computer.

A method includes, upon requesting access to a terminal, receiving, via a mobile computer, a communication certificate chain from a terminal computer included in the terminal. The method further includes establishing, via the mobile computer, a communication session with the terminal computer based on an issuer identifier of a root certificate authority in the communication certificate chain matching a subject identifier of a stored root certificate. The method further includes, upon establishing the communication session, determining, via the mobile computer, a respective issuer identifier associated with a respective root certificate in the corresponding access certificate chain for each of a plurality of access certificate chains. The method further includes, upon determining that the respective issuer identifier in one access certificate chain matches the subject identifier of the stored root certificate, selecting, via the mobile computer, the one access certificate chain. The method further includes transmitting the selected access certificate chain to the terminal computer.

The method can further include, upon determining that the issuer identifier of the root certificate authority in the communication certificate chain does not match the subject identifier of the stored root certificate, preventing, via the mobile computer, establishment of the communication session.

The method can further include, upon receiving authorization from a third computer, permitting, via the terminal computer, the mobile computer to access the terminal. The mobile computer may be included in a vehicle, and the third computer may be remote from the vehicle and the terminal.

The method can further include generating, via the third computer, the authorization in response to receiving a specified number of tokens from a fourth computer.

The method can further include, upon receiving the selected access certificate chain, authenticating, via the terminal computer, the selected access certificate chain based on the respective issuer identifier included in the selected access certificate chain matching the issuer identifier of the root certificate authority in the communication certificate chain. The method can further include, then, upon identifying a subject identifier from an end-user certificate in the selected access chain, transmitting, via the terminal computer, the subject identifier to a third computer. The method can further include, upon receiving authorization from the third computer, permitting, via the terminal computer, the mobile computer to access the terminal. The mobile computer may be included in a vehicle, and the third computer may be remote from the vehicle and the terminal.

The method can further include, upon determining that none of the issuer identifiers included in the respective access certificate chains match the subject identifier of the stored root certificate, determining, via the mobile computer, a respective subject identifier included in a respective end-user certificate for each of the access certificate chains. The method can further include comparing, via the mobile computer, each of the respective subject identifiers included in the respective end-user certificates to a subject identifier included in an intermediate certificate of the communication certificate chain. The intermediate certificate is issued by a root certificate authority. The method can further include, upon determining that the respective subject identifier in the respective end-user certificate of one access certificate chain matches the subject identifier in the intermediate certificate, selecting, via the mobile computer, the one access certificate chain. The method can further include transmitting, via the mobile computer, the selected access certificate chain to the terminal computer.

The method can further include, upon determining that at least two of the respective issuer identifiers included in the respective access certificate chains match subject identifier of the stored root certificate, comparing, via the mobile computer, respective subject identifiers included in respective intermediate certificates of the respective access certificate chains to each other. Each of the intermediate certificates are issued by a respective root certificate authority in the respective access certificate chain. The method can further include, upon determining that the respective subject identifiers included in the respective intermediate certificates match each other, determining, via the mobile computer, a respective subject identifier included in a respective end-user certificate for each of the corresponding access certificate chains including the at least two respective issuer identifiers. The method can further include comparing, via the mobile computer, each of the respective subject identifiers included in the respective end-user certificates to a subject identifier included in an intermediate certificate of the communication certificate chain. The intermediate certificate is issued by a root certificate authority. The method can further include, upon determining that the determined subject identifier in the end-user certificate of one access certificate chain matches the subject identifier in the intermediate certificate of the communication certificate chain, selecting, via the mobile computer, the one access certificate chain. The method can further include transmitting, via the mobile computer, the selected access certificate chain to the terminal computer The method can further include, upon determining that the at least two respective issuer identifiers do not match each other, determining, via the mobile computer, a subject identifier included in an intermediate certificate of the communication certificate chain. The intermediate certificate is issued by a root certificate authority in the communication certificate chain. The method can further include comparing, via the mobile computer, respective subject identifiers included in respective intermediate certificates of the respective access certificate chains to the subject identifier included in the intermediate certificate of the communication certificate chain. The method can further include selecting, via the mobile computer, one of the access certificate chains based on the subject identifier included in the intermediate certificate of the corresponding access certificate chain matching the subject identifier included in the intermediate certificate of the communication certificate chain.

The method can further include transmitting, via the mobile computer, the selected access certificate chain to the terminal computer Further disclosed herein is a computing device programmed to execute any of the above method steps. Yet further disclosed herein is a computer program product, including a computer readable medium storing instructions executable by a computer processor, to execute an of the above method steps.

The present disclosure describes systems and methods for selecting an access certificate chain based on a subject identifier associated with a root certificate authority. A mobile computer can store a plurality of certificate chains each associated with various entities that may support terminals that the mobile computer, e.g., in a vehicle, is authorized to access. For example, a vehicle computer may store certificate chains to access various charging stations. Typically, the mobile computer can store a plurality of access certificate chains each issued by various root certificate authorities. In the event that a selected access certificate chain is not issued by a root certificate authority associated with a terminal, the terminal computer may determine that the mobile computer is unauthorized to access the terminal unless additional information establishing authorization for the vehicle is provided, e.g., from a remote server computer. As described herein, a mobile computer can select an access certificate chain from a plurality of access certificate chains based on an issuer identifier associated with a root certificate authority. The mobile computer can then provide the selected access certificate chain to a computer of the terminal. Selecting the access certificate chain based on the issuer identifier associated with a root certificate authority provides an access certificate chain authorized for the root certificate authority associated with the terminal, which can increase efficiency over existing techniques in authorizing mobile computers to access terminal computers, and permitting the mobile computer or machinery associated with the mobile computer, such as a vehicle, to access the terminal.

A terminal herein means a physical structure. Sensors, a communications module, and a computer can be housed, mounted, stored, and/or contained, and powered, etc., on and/or in a terminal. The terminal may be available to a plurality of mobile computers to request access thereto. The terminal may, for example, store one or more types of objects (such as bicycles), within or attached to the physical structure of the terminal and permit the mobile computer (or a user thereof) to access the stored objects upon authorization of the mobile computer. As another example, the terminal may permit the vehicle to access the terminal to receive a service provided thereby upon authorizing the vehicle. A charging station for recharging electric vehicle batteries will be described herein as a non-limiting example of a terminal. A vehicle computer will be described as a non-limiting example of a mobile computer. It is to be understood that the terminal could be any physical structure accessible upon authorization by a mobile computer, and therefore the charging station computer described herein is merely an example of a terminal computer, and likewise, the vehicle computer described herein is merely an example of a mobile computer.

With reference to FIGS. 1-4, an example vehicle control system 100 includes a vehicle 105. The vehicle 105 may be any type of ground vehicle 105 with two or more wheels, e.g., a motorcycle or motorbike, passenger or commercial automobile such as a sedan, a coupe, a truck, a sport utility, a crossover, a van, a minivan, a taxi, a bus, etc., that includes batteries that can be recharged by a charging station 205, as described further below.

A vehicle computer 110 in the vehicle 105, receives data from sensors 115. The vehicle computer 110 is programmed to, upon requesting access to a charging station 205, receive a communication certificate chain 300 from a computer 210 included in the charging station 205. The vehicle computer 110 is further programmed to establish a communication session with the computer 210 based on an issuer identifier 320*c* of a root certificate authority in the communication certificate chain 300 matching a stored subject identifier. The vehicle computer 110 is further programmed to, upon establishing the communication session, determine, for each of a plurality of access certificate chains 400, a respective issuer identifier 420*c* of a respective root certificate authority in the corresponding access certificate chain 400. The vehicle computer 110 is further programmed to, upon determining that the respective issuer identifier 420*c* in one access certificate chain 400 matches the stored subject identifier, select the one access certificate chain 400. The vehicle computer 110 is further programmed to transmit the selected access certificate chain 400 to the computer 210.

Referring initially to FIG. 1, the vehicle 105 includes the vehicle computer 110, the sensors 115, actuators 120 to actuate various vehicle components 125, and a vehicle communications module 130. The communications module 130 allows the vehicle computer 110 to communicate with a remote server computer 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided premanufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 including controlling and/or monitoring components 125. The vehicle computer 110 may include programming to operate one or more of vehicle propulsion, steering, transmission, climate control, interior and/or exterior lights, horn, doors, etc., as well as to determine whether and when the vehicle computer 110, as opposed to a human operator, is to control such operations. Additionally, the computer may be programmed to determine whether and when a human operator is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide analog and/or digital data measuring or describing physical phenomena. "Data" herein means information that can be processed and/or stored by a digital computer. Data can be provided and/or represented in a variety of formats, e.g., binary, hexadecimal, alphanumeric e.g., ASCII, etc. A sensor herein means a device that can obtain data including one or more measurements of one or more physical phenomena. Vehicle sensors 115 could include cameras, lidar, radar, ultrasonic sensors, and various other sensors, including as described by way of example as follows. Some vehicle sensors 115 detect internal states of the vehicle 105, for example, wheel speed, wheel orientation, and engine and transmission variables. Some vehicle sensors 115 detect the position or orientation of the vehicle 105, for example, global positioning system GPS sensors; accelerometers such as piezo-electric or microelectromechanical systems MEMS; gyroscopes such as rate, ring laser, or fiber-optic gyroscopes; inertial measurements units IMU; and magnetometers. Some sensors 115 detect the external world, for example, radar sensors, scanning laser range finders, light detection and ranging LIDAR devices, and image processing sensors such as cameras. A LIDAR device detects distances to objects by emitting laser pulses and measuring the time of flight for the pulse to travel to the object and back. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

Some sensors 115 are communications devices, for example, vehicle-to-infrastructure (V2I) or vehicle-to-vehicle (V2V) devices. Sensor operation can be affected by obstructions, e.g., dust, snow, insects, etc. Often, but not necessarily, a sensor 115 includes a digital-to-analog converter to converted sensed analog data to a digital signal that can be provided to a digital computer, e.g., via a network. Sensors 115 can include a variety of devices, and can be disposed to sense an environment, provide data about a machine, etc., in a variety of ways. For example, the sensors 115 can be mounted to any suitable location in or on the vehicle 105 to collect image data of the environment around the vehicle 105. Image data herein means digital image data, e.g., comprising pixels with intensity and color values, that can be acquired by camera sensors 115.

Moreover, various controllers in a vehicle 105 may operate as vehicle sensors 115 to provide data via the vehicle network or bus, e.g., data relating to vehicle 105 speed, location, subsystem and/or component 125 status, etc. Further, other sensors 115 could include cameras, short range radar, long range radar, LIDAR, and/or ultrasonic transducers, weight sensors, accelerometers, motion detectors, etc., i.e., sensors to provide a variety of data. The vehicle computer 110 is programmed to receive data from one or more sensors 115 substantially continuously, periodically, and/or when instructed by a remote server computer 160, etc. To provide just a few non-limiting examples, sensor data could include data for determining a position of a component 125, a location of an object, a speed of an object, a type of an object, a slope of a roadway or surface of an area, a temperature, a presence or amount of moisture, a data rate, etc. Location data specifies a point or points on a ground surface and may be in a known form, e.g., geo-coordinates such as latitude and longitude coordinates obtained via a navigation system, as is known, that uses the Global Positioning System (GPS).

The vehicle 105 actuators 120 are implemented via circuits, chips, or other electronic and/or mechanical components that can actuate various vehicle subsystems in accordance with appropriate control signals as is known. The actuators 120 may be used to control components 125 to operate a vehicle 105.

In the context of the present disclosure, a vehicle component 125 is one or more hardware components adapted to perform a mechanical or electro-mechanical function or operation-such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a park assist component, an adaptive cruise control component, an adaptive steering component, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or short-range radio communications, etc.) to another vehicle, and/or to a remote server computer 160 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), cellular V2X (CV2X), and/or wide area networks (WAN), including the Internet, providing data communication services. The label "V2X" is used herein for communications that may be vehicle-to-vehicle (V2V) and/or vehicle-to-infrastructure (V2I), and that may be provided by communication module 130 according to any suitable short-range communications mechanism, e.g., DSRC, cellular, or the like.

The network 135 represents one or more mechanisms by which a vehicle computer 110 may communicate with remote computing devices, e.g., the remote server computer 140, another vehicle computer, a user device 145, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 160 can be accessed via the network 135, e.g., the Internet, a cellular network, and/or or some other wide area network.

The user device 145 can be a conventional computing device, i.e., including one or more processors and one or more memories, programmed to provide operations such as disclosed herein. The user device 145 can be a portable device. A portable device can be any one of a variety of computers that can be used while carried by a person, e.g., a smartphone, a tablet, a personal digital assistant, a smart watch, a key fob, etc. Further, the user device 145 can be accessed via the network 135, e.g., the Internet, a cellular network, and/or or some other wide area network.

Figure 2:
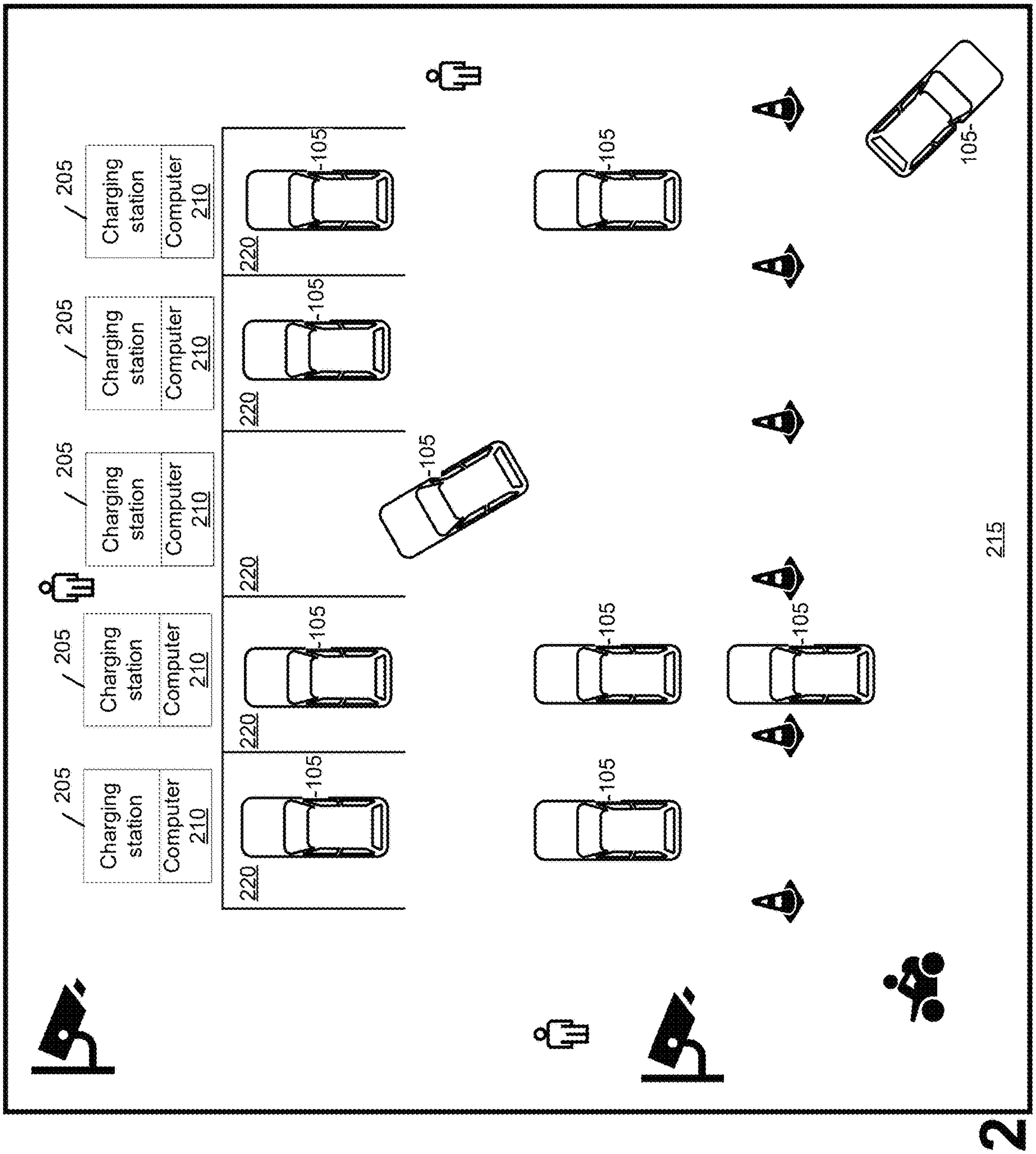
FIG. 2 is a block diagram of additional details of the charging station system of FIG. 1, including details of vehicles in the charging station system.
Figure 3:
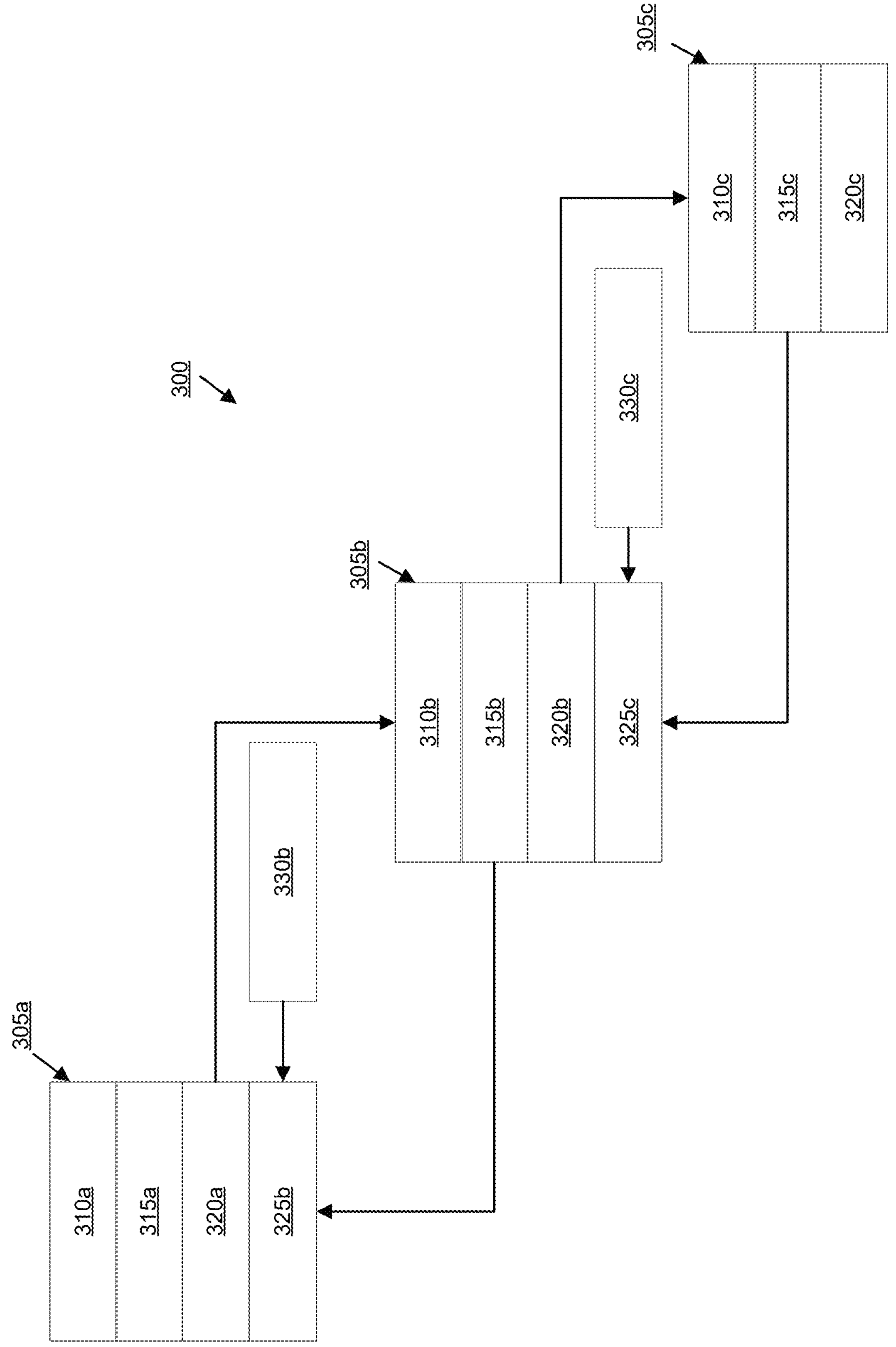
FIG. 3 illustrates a block diagram of an example communication certificate chain.
Figure 4:
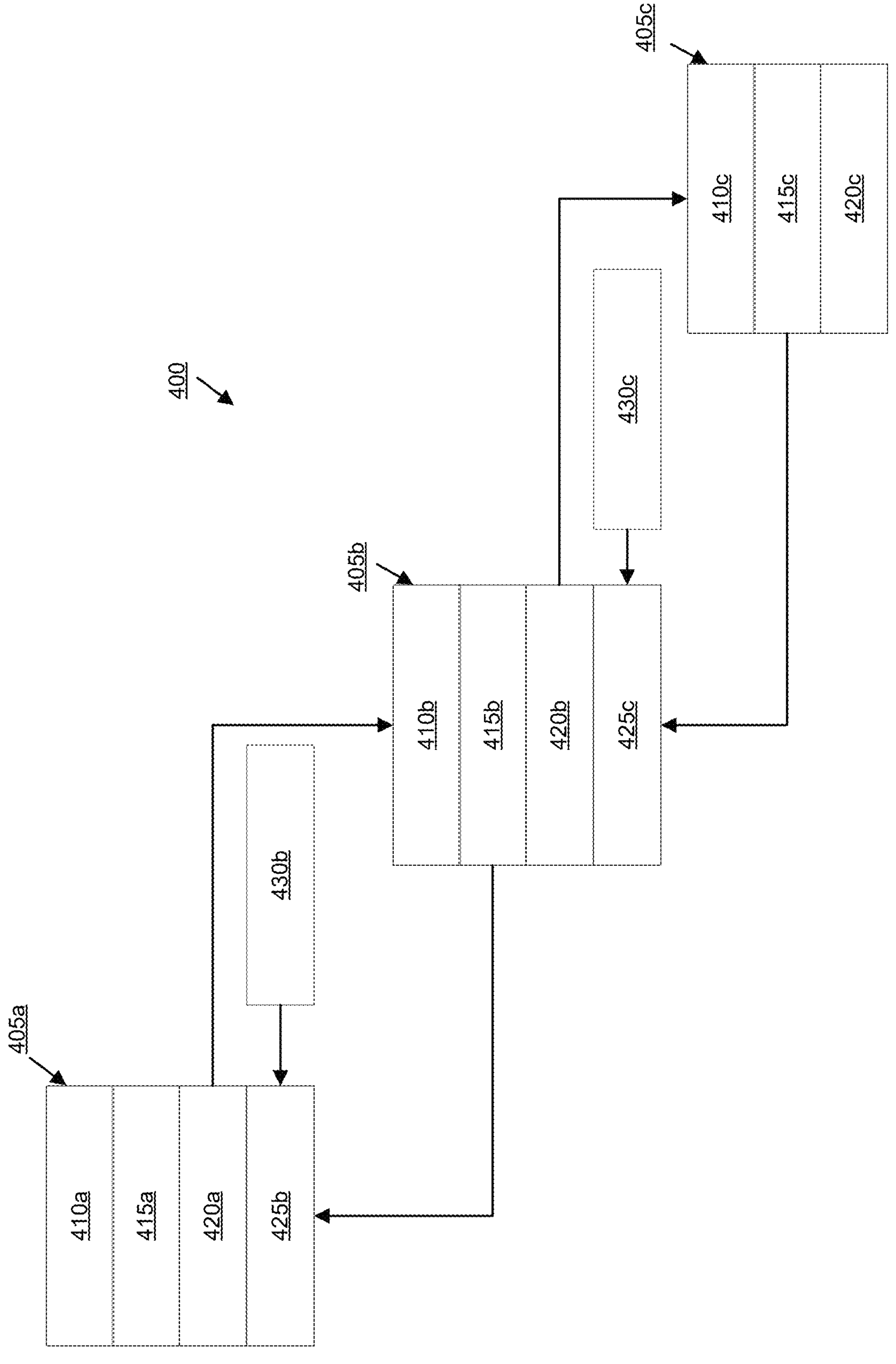
FIG. 4 illustrates a block diagram of an example access certificate chain.

Turning now to FIG. 2, an exemplary architecture for a vehicle charging station system 200 can provide one or more charging stations 205 to accommodate vehicles 105 with electric batteries to be recharged. Each charging station 205 includes a physical structure on or in which sensors (not shown), as well as a communications module (not shown), and a computer 210 can be housed, mounted, stored, and/or contained, and powered, etc. The charging station 205 typically stationary, i.e., fixed to and not able to move from a specific physical location. The respective one or more charging stations 205 in the charging station system 200 can use any suitable mechanism for recharging batteries of vehicles 105, e.g., a plug-in connection, inductive charging, etc.

The sensors, communication module, and computer 210 typically have features in common with the sensors 115, the vehicle computer 110 and the vehicle communications module 130, and therefore will not be described further to prevent redundancy. Although not shown for case of illustration, the charging station 205 also includes a power source such as a battery, solar power cells, and/or a connection to a power grid.

An area 215 of the charging station system 200 can be defined, e.g., as a perimeter (an illustrative example of which is the rectangle shown encompassing other elements described in FIG. 2) encompassing the charging stations 205 and other elements of the charging station system 200. The area 215 can include one or more sub-areas 220 corresponding to respective charging stations 205. That is, the sub-areas 220 are provided as areas in which vehicles 105 can be parked while receiving electrical charge for their batteries from a respective charging station 205. The charging station system area 215 can also include a region in which vehicles 105 may park and/or travel, e.g., while awaiting access to a charging station 205, to park to visit some other facility of the charging station 205, to enter and exit the area 215, etc. The area 215 and sub-areas 220 of the charging station system 200, and any other regions thereof, can be defined according to location coordinates, a geo-fence, or any other suitable mechanism for defining location boundaries.

The vehicle computer 110 is programmed to determine whether to establish a communication session with the computer 210 based on a received communication certificate chain 300. The vehicle computer 110 receives, e.g., via various suitable communication methods, such as V2X communications, a wired connection, etc., the communication certificate chain 300 from the computer 210 of the charging station 205. The communication certificate chain 300 may be stored, e.g., in a memory of the computer 210. The vehicle computer 110 can, for example, receive the communication certificate chain 300 based on a charging mechanism of the charging station 205 engaging with the vehicle 105. As another example, the vehicle computer 110 can receive the communication certificate chain 300 based on sensor data, e.g., from the charging station sensors and/or vehicle 105 sensors 115, indicating that the vehicle 105 is within the sub-area 220. As yet another example, the vehicle computer 110 can receive the communication certificate chain 300 in response to transmitting a request, e.g., via V2X communications, to access the charging station 205.

As used herein, a "certification chain" is an ordered or linked list of certificates linked via digital signatures of respective certificate authorities. As used herein, a "certificate" is an electronic document which uses a digital signature to bind a key with a certificate authority. As used herein, a "certificate authority" is an entity that signs and issues digital certificates to authenticate data. As used herein, a "root certificate authority" is a certificate authority that issues a root certificate.

The communication certification chain 300 (see FIG. 3) includes an end-user certificate 305*a*, at least one intermediate certificate 305*b*, and a root certificate 305*c*. As used herein, a "root certificate" is a certificate issued and signed by a root certificate authority. As used herein, an "intermediate certificate" is a certificate issued and signed by a certificate authority that is linked forward to an end-user certificate and linked backward to a root certificate. As used herein, an "end-user certificate" is a certificate issued to and stored by an entity and linked backward to an intermediate certificate, i.e., includes the digital signature of the certificate authority for the intermediate certificate.

Each certificate 305 includes a subject identifier 310 identifying an entity storing the certificate 305, a public key 315 of the certificate authority that issued the certificate 305, and an issue identifier 320 identifying the certificate authority that issued the certificate 305. Each end-user certificate

305*a* and intermediate certificate 305*b* in the certificate chain 300 includes a digital signature 325 of the certificate authority that issued the respective certificate 305. A root certificate 305*c* in the certificate chain 300 may include a digital signature 325*c*, e.g., the root certificate 305*c* may be self-signed. A public key 320 is a cryptographic key as utilized in a Key Infrastructure (PKI). The digital signature of each certificate is generated using a private key 330 of the certificate authority. A private key 330 is a cryptographic key as utilized in the PKI.

To authenticate the communication certificate chain 300, the vehicle computer 110 decrypts the digital signature 325 of the end-user certificate 305*a* and the at least one intermediate certificate 305*b* in the communication certificate chain 300 and determines whether each certificate 305 is verified. To decrypt the digital signature 325*b* of the end-user certificate 305*a*, the vehicle computer 110 can utilize, according to the PKI, the public key 315*b* of the certificate authority that signed the end-user certificate 305*a*. Upon decrypting the digital signature 325*b* of the end-user certificate 305*a*, the vehicle computer 110 can identify the subject identifier 310*b* in the certificate 305 chained, or linked, to the end-user certificate 305*a* via the digital signature 325*b*. The vehicle computer 110 can then compare the subject identifier 310*b* in the certificate 305 chained to the end-user certificate 305*a* via the digital signature 325*b* with the issuer identifier 320*a* of the end-user certificate 305*a*. If the issuer identifier 320*a* matches the subject identifier 310*b*, then the vehicle computer 110 verifies the end-user certificate 305*a*. If the issuer identifier 320*a* does not match the subject identifier 310*b*, then the vehicle computer 110 does not verify the end-user certificate 305*a*.

The vehicle computer 110 can analyze the certificate 305 chained to another certificate 305 via a digital signature 325 to identify the certificate 305 as an intermediate certificate 305*b* or a root certificate 305*c*. For example, upon decrypting the digital signature 325 of the certificate 305, the vehicle computer 110 can compare the subject identifier 310*b* of the certificate 305 to the issuer identifier 320*b* of the certificate 305. If the subject identifier 310*b* matches the issuer identifier 320*b*, then the vehicle computer 110 identifies the certificate 305 as the root certificate 305*c*. If the subject identifier 310*b* does not match the issuer identifier 320*b*, then the vehicle computer 110 identifies the certificate 305 as the intermediate certificate 305*b*.

Upon identifying the certificate 305 as the intermediate certificate 305*b*, the vehicle computer 110 can verify the intermediate certificate 305*b*. For example, to decrypt the digital signature 325*c* of the intermediate certificate 305*b*, the vehicle computer 110 can utilize, according to the PKI, the public key 315*c* of the certificate authority that signed the intermediate certificate 305*b*. Upon decrypting the digital signature 325*c* of the intermediate certificate 305*b*, the vehicle computer 110 can identify the subject identifier 320*c* of the certificate 305 chained to the intermediate certificate 305*b* via the digital signature 325*c*. The vehicle computer 110 can then compare the subject identifier 320*c* with the issuer identifier 310*b* of the intermediate certificate 305*b*. If the issuer identifier 320*b* matches the subject identifier 310*c*, then the vehicle computer 110 verifies the intermediate certificate 305*b*. If the issuer identifier 310*b* does not match the subject identifier 320*c*, then the vehicle computer 110 may not verify the intermediate certificate 305*b*. In one example, the vehicle computer 110 may determine whether to verify the intermediate certificate 305 based on a Certificate Trust List (CTL), as discussed below. The vehicle computer 110 can verify each intermediate certificate 305*b* in the communication certificate chain 300 in this manner.

As used herein, a "Certificate Trust List," or "CTL," is a list of public keys signed by a trusted entity. The CTL may be stored, e.g., in a memory of the vehicle computer 110. If the public key of the intermediate certificate 305*b* matches one of the public keys stored in the CTL, then the vehicle computer 110 can verify the intermediate certificate 305*b*. Upon verifying the intermediate certificate 305*b* with the CTL, the vehicle computer 110 can establish a communication session with the computer 210, as discussed below. If the public key of the intermediate certificate 305*b* does not match any public key in the CTL, then the vehicle computer 110 does not verify the intermediate certificate 305*b*.

Upon identifying the certificate 305 as the root certificate 305*c*, the vehicle computer 110 can compare the issuer identifier 320*b* of the intermediate certificate 305*b* issued by the root certificate authority of the communication certificate chain 300 to subject identifiers of various stored root certificates. For example, the vehicle computer 110 can store, e.g., in a memory thereof, a plurality of root certificates each issued by various entities that provide charging stations 205 to recharge of vehicle 105 batteries. Upon determining that the issuer identifier 320*b* of the intermediate certificate 305*b* issued by the root certificate authority of the communication certificate chain 300 matches the subject identifier of one stored root certificate, the vehicle computer 110 can establish the communication session with the computer 210, e.g., via a Transport Layer Security (TLS) protocol.

During the communication session, the vehicle computer 110 and the computer 210 can utilize a key agreement protocol, e.g., Diffie-Hillman exchange, to generate a shared (symmetric) key that encrypts/decrypts messages transmitted/received during the communication session, e.g., via a known symmetric block cipher AES-128-CBC and AES-128-GCM. Additionally, the vehicle computer 110 and the computer 210 can utilize a known Elliptic Curve Digital Signature Algorithm (ECDSA), e.g., a cryptographic hash function such as Secure Hash Algorithm 256 (SHA-256), to authenticate the communications transmitted/received during the communication session.

If any of the certificates 305*a*, 305*b* in the communication certificate chain 300 are not verified or the issuer identifier 320*b* of the intermediate certificate 305*b* issued by the root certificate authority of the communication certificate chain 300 does not match the subject identifier of one stored root certificate, then the vehicle computer 110 does not establish the communication session with the computer 210. Additionally, the vehicle computer 110 may transmit, e.g., via the network 135, a message to the computer 210 specifying that communication certificate chain 300 is not authenticated. In this situation, the computer 210 may permit the vehicle computer 110 to access the charging station 205 based on receiving a specified number of tokens from the remote server computer 140.

In the present context, a "token" is data that represents a number of units of a transferrable object. The unit can be, for example, a unit of currency money, e.g., 0.01 cents, 0.1 cents, 1 cent, a unit of virtual currency (or faction thereof), etc., an amount of an object, e.g., size or weight, of a raw material object, e.g., 1 gram of gold or silver, 1 foot of lumber, etc. One or more computers 110, 140, 145, 210 can store, e.g., in a memory thereof, the tokens and can transmit the tokens to one or more computers 110, 140, 145, 210. For example, the user device 145, the vehicle computer 110, or another computer associated with a user of the vehicle 105, e.g., an entity computer remote from the vehicle 105, can store tokens associated with the user.

To receive the specified number of tokens, the computer 210 can, for example, actuate a display on the charging station 205 to output a message specifying the number of tokens. The specified number of tokens may be stored, e.g., in a memory of the computer 210, and may be specified by the entity providing the charging station 205. The user may then provide a user input to a user device 145 to authorize transfer of the specified number of tokens to the computer 210. In a situation in which the tokens are stored, e.g., in a memory of the user device 145, the user device 145 may be programmed to transfer the specified number of tokens directly to the computer 210, e.g., via the network 135, as long as a number of stored tokens is greater than or equal to the specified number of tokens. In a situation in which the tokens are stored on another computer, e.g., in a memory of the vehicle computer 110, in a memory of the remote server computer 140, etc., the user device 145 may be programmed to transmit a message, e.g., via the network 135, to the computer 110, 140 storing the tokens authorizing the transfer of the tokens to the computer 210. The storing computer 110, 140 may then be programmed to transfer the specified number of tokens to the computer 210, e.g., via the network 135, as long as a number of stored tokens is greater than or equal to the specified number of tokens.

Upon receiving the specified number of tokens, the computer 210 can allow the vehicle 105 to access the charging station 205. That is, the computer 210 can initiate a charging operation. During the charging operation, the computer 210 and the vehicle computer 110 can communicate to actuate components 125 of the vehicle 105 and/or a power source of the charging station 205 to transfer energy from the power source of the charging station 205 to the vehicle 105 battery.

Upon establishing the communication session, the vehicle computer 110 can select an access certificate chain 400 based on the subject identifier of the one stored root certificate that matched the issuer identifier **320*b* of the intermediate certificate 305*b* issued by the root certificate authority of the communication certificate chain 300. For example, the vehicle computer 110 may store, e.g., in a memory thereof, a plurality of access certificate chains 400. Each access certificate chain 400 may include various certificates issued by various certificate authorities that support recharging vehicle 105** batteries.

Each access certification chain 400 (See FIG. 4) includes an end-user certificate **405*a*, at least one intermediate certificate 405*b*, and a root certificate 405*c*. Each certificate 405 includes a subject identifier 410 identifying an entity storing the certificate 405, a public key 415 of a certificate authority that issued the certificate 405, and an issuer identifier 420 identifying the certificate authority that issued the certificate 405. Each end-user certificate 405*a* and intermediate certificate 405*b* in the certificate chain 300 includes a digital signature 425 of the certificate authority that signed the certificate 405. The root certificate 405*c* may include a digital signature 425*c*, e.g., the root certificate 405*c* may be self-signed. For each certificate 405 in the access certificate contract chain 400, the vehicle computer 110 may verify each certificate 405, according to the PKI, as described above regarding verifying the certificates 305 in the communication certificate chain 300**.

Upon decrypting the digital signatures 425 of the respective certificates 405 in each access certificate chain 400, the vehicle computer 110 can analyze the respective certificates 405 to identify the respective certificates 405 as an intermediate certificate **405*b* or a root certificate 405*c* in the same manner described above. Upon identifying the respective root certificates 405*c* in each access certificate chain 400, the vehicle computer 110 can determine respective issuer identifiers 420*b* of respective intermediate certificates 405*b* issued by respective root certificate authorities of the respective access certificate chain 400 in the same manner as described above. The vehicle computer 110 can then compare each of the respective issuer identifiers 420*b* of the respective intermediate certificates 405*b* issued by respective root certificate authorities of the respective access certificate chain 400 to the stored subject identifier of the one stored root certificate. If the respective issuer identifier 420*b* of the intermediate certificate 405*b* issued by respective root certificate authorities of the one access certificate chain 400 matches the stored subject identifier of the one stored root certificate, then the vehicle computer 110 selects the one access certificate chain 400 and transmits the one access certificate chain 400 to the computer 210**, e.g., via the TLS protocol.

If the respective issuer identifiers **420*b* of respective intermediate certificates 405*b* issued by respective root certificate authorities of more than one access certificate chain 400 matches the stored subject identifier of the one stored root certificate, then, for each of the access certificate chains 400 with the matching respective issuer identifiers 420*b*, the vehicle computer 110 determines the subject identifiers 410*b* of the respective intermediate certificates 405*b* issued by respective root certificate authorities of the respective access certificate chain 400. The vehicle computer 110 then compares the subject identifiers 410*b* to each other. If the subject identifiers 410*b* do not match each other, then the vehicle computer 110 compares the subject identifier 310*b* of the intermediate certificate 305*b* issued by the root certificate authority of the communication certificate chain 300 to the subject identifiers 410*b*. The vehicle computer 110 selects the one access certificate chain 400 that includes the intermediate certificate 405*b* issued by the root certificate authority with the subject identifier 410*b* that matches the subject identifier 310*b* of the intermediate certificate 305*b* issued by the root certificate authority of the communication certificate chain 300. The vehicle computer 110 then transmits the selected access certificate chain 400 to the computer 210**, e.g., via the TLS protocol.

If the subject identifiers **410*b* match each other, or if the issuer identifiers 420*b* of respective intermediate certificates 405*b* issued by respective root certificate authorities of each access certificate chain 400 do not match the issuer identifier 320*b* of the intermediate certificate 305*b* issued by the root certificate authority of the communication certificate chain 300, then the vehicle computer 110 determines the subject identifiers 410*a* for the respective end-user certificates 405*a* in each access certificate chain 400. The vehicle computer 110 then compares the subject identifier 310*b* for the intermediate certificate 305*b* issued by the root certificate authority of the communication certificate chain 300 to the subject identifiers 410*a*. The vehicle computer 110 selects the one access certificate chain 400 that includes the subject identifier 410*a* that matches the subject identifier 310*b* included in the communication certificate chain 300 and transmits the selected access certificate chain 400 to the computer 210**, e.g., via the TLS protocol.

Upon receiving the selected access certificate chain 400, the computer 210 is programmed to verify each certificate 405 in the selected access certificate chain 400 according to the PKI, as described above. Upon decrypting the respective digital signature 425 of each certificate 405 in the selected access certificate chain 400, the vehicle computer 110 can analyze the certificate 405 to identify the certificate 405 as an intermediate certificate 405*b* or a root certificate 405*c* in the same manner described above. Upon identifying the root certificate 405*c* in the selected access certificate chain 400, the vehicle computer 110 can determine the issuer identifier 420*b* of the intermediate certificate 405*b* chained to the root certificate 405*c* in the same manner as described above. The vehicle computer 110 can then compare the issuer identifier 420*b* of the intermediate certificate 405*b* chained to the root certificate 405*c* in the selected access certificate chain 400 to the issuer identifier 320*b* of the intermediate certificate 305*b* issued by the root certificate authority of the communication certificate chain 300. If the issuer identifier 420*b* of the intermediate certificate 405*b* chained to the root certificate 405*c* in the selected access certificate chain 400 does not match the issuer identifier 320*b* of the intermediate certificate 305*b* issued by the root certificate authority of the communication certificate chain 300, then the computer 210 prevents the vehicle computer 110 from accessing the charging station 205. Additionally, or alternatively, the computer 210 may terminate the communication session.

If the issuer identifier 420*b* of the intermediate certificate 405*b* issued by the root certificate authority of the selected access certificate chain 400 matches the issuer identifier 320*b* of the intermediate certificate 305*b* issued by the root certificate authority of the communication certificate chain 300, then the computer 210 determines the subject identifier 410*a* from the end-user certificate 405*a* in the selected access certificate chain 400. The computer 210 then transmits the subject identifier 410*a* to the remote server computer 140, e.g., via the network 135. If the computer 210 receives authorization from the remote server computer 140 in response to transmitting the subject identifier 410*a*, then the computer 210 initiates the charging operation with the vehicle 105. The authorization may cause or allow the computer 210 to initiate the charging operation. If the computer 210 does not receive authorization from the remote server computer 140 in response to transmitting the subject identifier 410*a*, then the computer 210 does not initiate the charging operation.

Upon receiving the subject identifier 410*a*, the remote server computer 140 is programmed to determine whether the vehicle 105 is authorized or unauthorized to recharge the vehicle 105 battery via the charging station 205. The remoter server computer 140 can maintain a look-up table, or the like, that associates various subject identifiers 410*a* as being authorized. The look-up table may further associate a user device 145 with each authorized subject identifier 410*a*. The remoter server computer 140 can compare the received subject identifier 410*a* to the subject identifiers stored in the look-up table. If the received subject identifier 410*a* matches a stored subject identifier, then the remote server computer 140 determines that the vehicle 105 is authorized. If the received subject identifier 410*a* does not match a stored subject identifier, then the remote server computer 140 determines that the vehicle 105 is unauthorized. In this situation, the remote server computer 140 may transmit a cancellation to the computer 210. The cancellation may include a command or directive for the computer 210 to not initiate the charging operation.

Upon determining that the vehicle 105 is authorized, the remote server computer 140 can compare the number of available tokens associated with the authorized vehicle 105 to a predetermined number of tokens. The predetermined number of tokens may be stored, e.g., in a memory of the remote server computer 140. The predetermined number of tokens may be specified by, e.g., the entity that provides the charging station 205.

The remote server computer 140 can, for example, store the tokens and associate the tokens with various authorized vehicle 105. The remote server computer 140 can receive tokens from one or more computers 110, 145 associated with authorized vehicles 105, and can transmit tokens to computers 210 associated with the charging stations 205. If the number of tokens associated with the authorized vehicle 105 is greater than or equal to the predetermined number of tokens, then the remote server computer 140 can transfer the predetermined number of tokens from the authorized user to the charging station 205. That is, the remote server computer 140 can transmit the predetermined number of tokens associated with the authorized vehicle 105 to the computer 210. Upon transferring the tokens from the authorized vehicle 105, the remote server computer 140 can transmit the authorization to the computer 210.

If the number of tokens associated with the authorized vehicle 105 is less than the predetermined number of tokens, then the remote server computer 140 may transmit a cancellation to the computer 210. Additionally, or alternatively, the remote server computer 140 can transmit a message to the user device 145 requesting a number of tokens. The requested number of tokens corresponds to a difference between the available tokens associated with the authorized vehicle 105 and the predetermined number of tokens. The user device 145 may be programmed to transmit the requested number of tokens, e.g., in response to receiving a user input. Upon receiving the requested number of tokens from the user device 145, the remote server computer 140 can transfer the predetermined number of tokens and the authorization to the computer 210.

Figure 5:
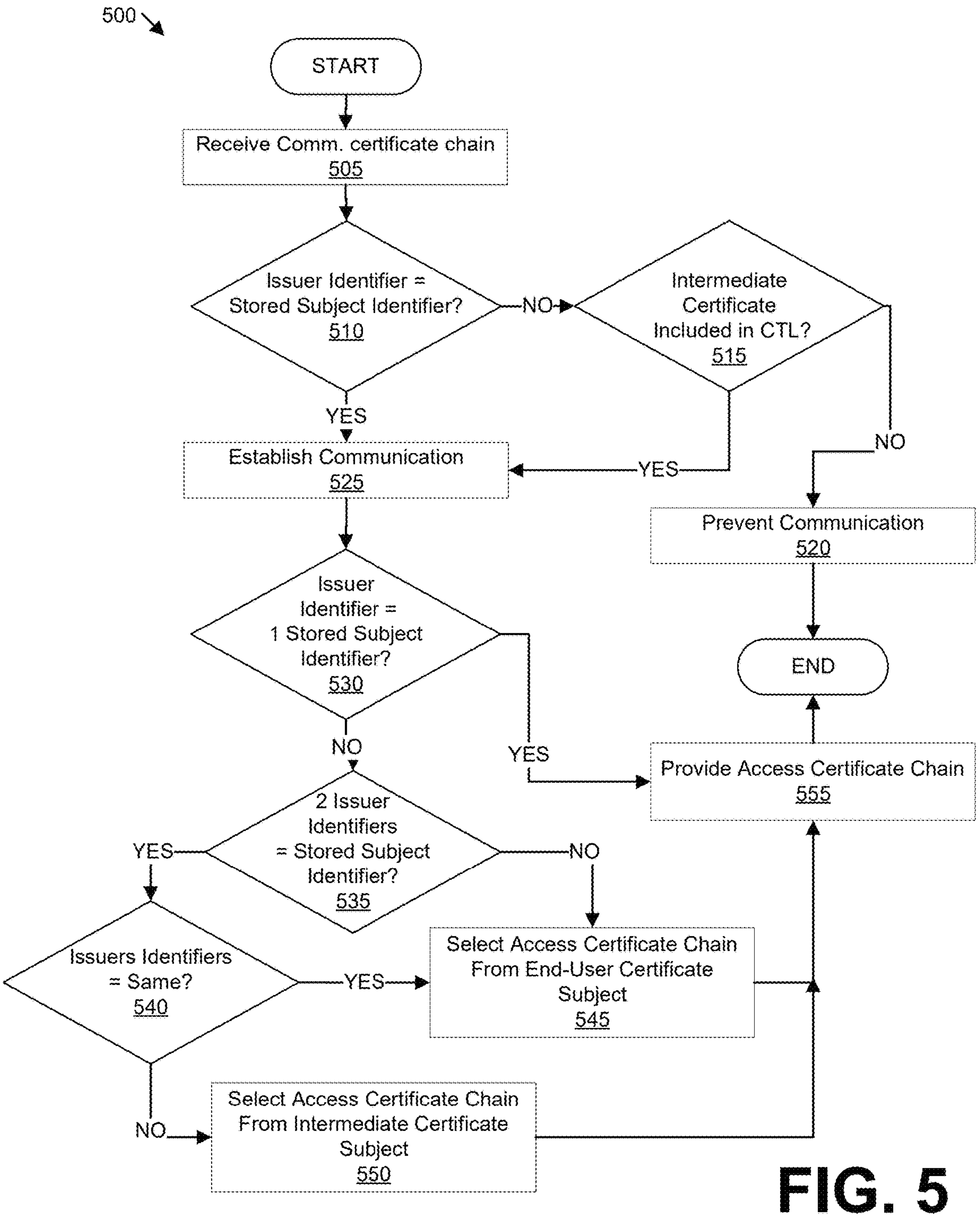
FIG. 5 is an example process for selecting an access certificate chain.

FIG. 5 is a diagram of an example process 500 for selecting an access certificate chain 400 based on an issuer identifier 420*b* of an intermediate certificate 405*b* issued by a root certificate authority of the access certificate chain 400. The process 500 begins in a block 505. The process 500 can be carried out by a mobile computer, e.g., a vehicle computer 110 included in the vehicle 105, executing program instructions stored in a memory thereof.

In the block 505, the vehicle computer 110 receives a communication certificate chain 300 from a computer 210 of a charging station 205. The vehicle computer 110 can, for example, receive the communication certificate chain 300 based on a charging mechanism of the charging station 205 engaging the vehicle 105, as discussed above. The process 500 continues in a block 510.

In the block 510, the vehicle computer 110 determines whether an issuer identifier 320*b* of an intermediate certificate 305*b* issued by a root certificate authority of the communication certificate chain 300 matches a subject identifier of a stored root certificate. The vehicle computer 110 can verify the certificates 305*a*, 305*b* in the communication certificate chain 300, as discussed above. Upon verifying the certificates 305*a*, 305*b*, the vehicle computer 110 can determine the issuer identifier 320*b* of the intermediate certificate 305*b* issued by the root certificate authority of the communication certificate chain 300 based on the intermediate certificate 305*b* that includes the digital signature 325*c* of the root certificate authority. If the issuer identifier 320*b* matches the subject identifier of one stored root certificate, then the process 500 continues in a block 525. Otherwise, the process 500 continues in a block 515.

In the block 515, the vehicle computer 110 determines whether the issuer identifier 320*b* of the intermediate certificate 305*b* issued by the root certificate authority of the communication certificate chain 300 is included in a CTL. The CTL may be stored, e.g., in a memory of the vehicle computer 110, as discussed above. The vehicle computer 110 can compare the intermediate certificate 305*b* issued by the root certificate authority of the communication certificate chain 300 to each of a plurality of certificates included in the CTL, as discussed above. If the intermediate certificate 305*b* issued by the root certificate authority of the communication certificate chain 300 is included in the CTL, then the process 500 continues in the block 525. Otherwise, the process 500 continues in a block 520.

In the block 520, the vehicle computer 110 prevents establishment of a communication session with the computer 210, as discussed above. Additionally, the vehicle computer 110 may transmit, e.g., via the network 135, a message to the computer 210 specifying that the communication certificate chain 300 is not authenticated, as discussed above. The process 500 ends following the block 520.

In the block 525, the vehicle computer 110 establishes a communication session with the computer 210, e.g., via a TLS protocol, as discussed above. The process 500 continues in a block 530.

In the block 530, the vehicle computer 110 determines whether an issuer identifier 420*b* of an intermediate certificate 405*b* issued by a root certificate authority of one access certificate chain 400 matches the subject identifier of the one stored root certificate, e.g., that matched the issuer identifier 320*b* of the intermediate certificate 305*b* issued by the root certificate authority of the communication certificate chain 300. The vehicle computer 110 can authenticate each of a plurality of access certificate chains 400 according to the PKI, as discussed above. Upon identifying the root certificate 405*c* of each access certificate chain 400, the vehicle computer 110 can compare each issuer identifier 420*b* for the respective intermediate certificates 405*b* issued by the respective root certificate authorities to the subject identifier of the one stored root certificate. If one and only one of the issuer identifiers 420*b* matches the subject identifier of the one stored root certificate, then the vehicle computer 110 selects the access certificate chain 400 that includes the issuer identifier 420*b* that matches the subject identifier of the one stored root certificate, and the process 500 continues in a block 555. Otherwise, the process 500 continues in a block 535.

In the block 535, the vehicle computer 110 determines whether the issuer identifier 420*b* of the intermediate certificate 405*b* issued by the root certificate authority of more than one access certificate chain 400 matches the subject identifier of the one stored root certificate. The block 535 is substantially identical to the block 530 and will not be repeated herein to prevent redundancy. If the issuer identifier 420*b* of the intermediate certificate 405*b* issued by the root certificate authority of more than one access certificate chain 400 match the subject identifier of the one stored root certificate, then the process 500 continues in a block 540. Otherwise, the process 500 continues in a block 545.

In the block 540, the vehicle computer 110 determines whether the issuer identifiers 420*b* of the intermediate certificate 405*b* issued by the root certificate authority of more than one access certificate chain 400 are the same. That is, the vehicle computer 110 compares the issuer identifiers 420*b* of the intermediate certificate 405*b* issued by the root certificate authority of the respective access certificate chains 400 to each other. If the issuer identifiers 420*b* of the intermediate certificate 405*b* issued by the root certificate authority of the access certificate chains 400 are the same, then the process 500 continues in the block 545. Otherwise, the process 500 continues in a block 550.

In the block 545, the vehicle computer 110 selects one access certificate chain 400 based on a subject identifier 410*a* of the end-user certificate 405*a*. The vehicle computer 110 compares the subject identifier 410*a* of the end-user certificate 405*a* for each access certificate chain 400 to a subject identifier 320*b* of the intermediate certificate 305*b* issued by the root certificate authority of the communication certificate chain 300. The vehicle computer 110 selects the access certificate chain 400 that includes the subject identifier 410*a* that matches the subject identifier 320*b* of the intermediate certificate 305*b* issued by the root certificate authority of the communication certificate chain 300. The process 500 continues in the block 555.

In the block 550, the vehicle computer 110 selects one access certificate chain 400 based on a subject identifier 410*b* of the intermediate certificate 405*b* issued by the root certificate authority of the respective access certificate chain 400. The vehicle computer 110 compares the subject identifier 410*b* of the intermediate certificates 405*b* issued by the respective root certificate authorities for each access certificate chain 400 to the subject identifier 320*b* of the intermediate certificate 305*b* issued by the root certificate authority of the communication certificate chain 300. The vehicle computer 110 selects the access certificate chain 400 that includes the subject identifier 410*b* that matches the subject identifier 320*b* of the intermediate certificate 305*b* issued by the root certificate authority of the communication certificate chain 300. The process 500 continues in the block 555.

In the block 555, the vehicle computer 110 provides, e.g., via the TLS protocol, the selected access certificate 400 to the computer 210. The process 500 ends following the block 555.

Figure 6:
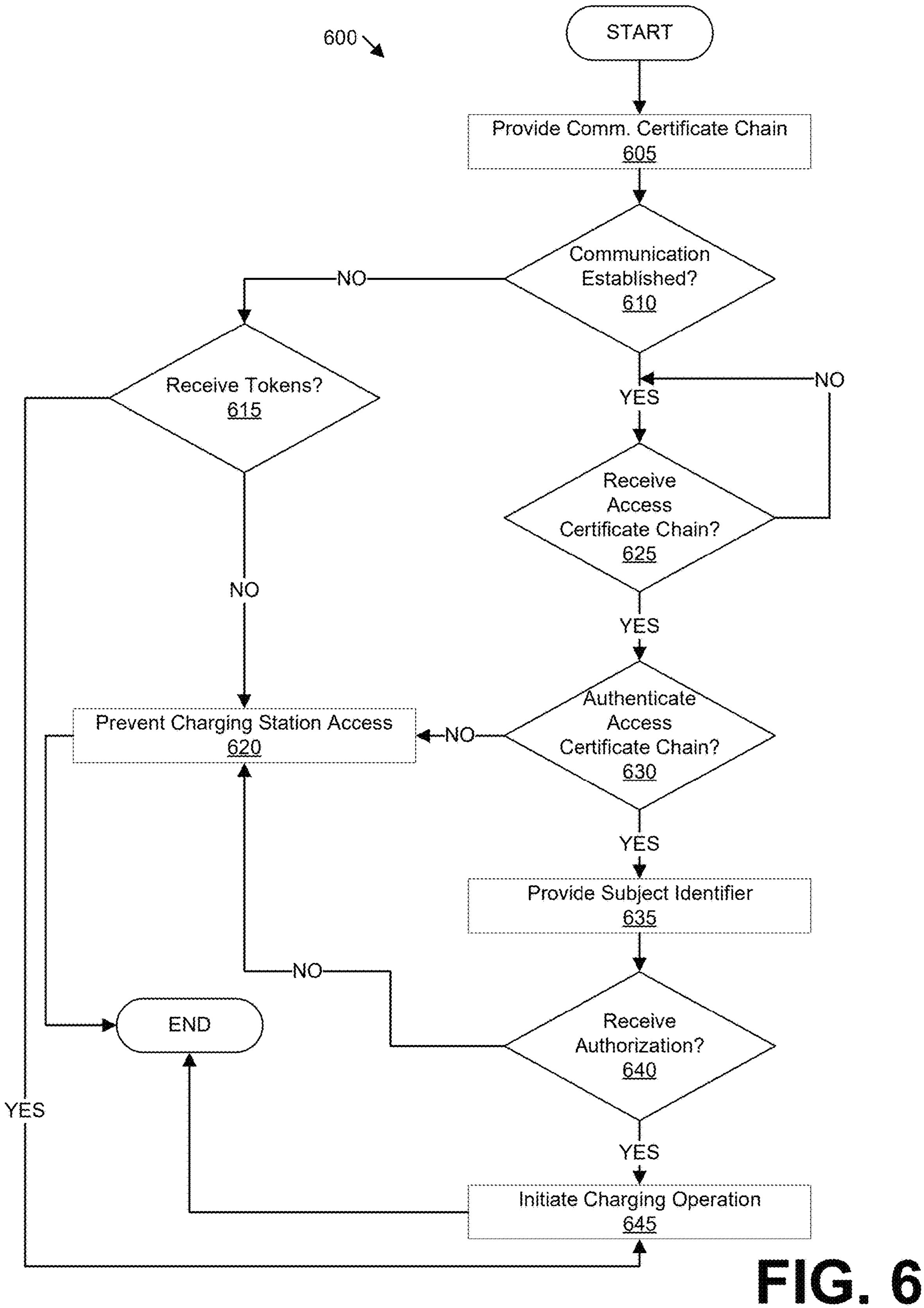
FIG. 6 is an example process for initiating a charging operation between a terminal and a mobile computer.

FIG. 6 is a diagram of an example process 600 for initiating a charging operation between a charging station 205 and a vehicle computer 110, i.e., a terminal and a mobile computer. The process 600 begins in a block 605. The process 600 can be carried out by a terminal computer, e.g., a computer 210 included in the charging station 205, executing program instructions stored in a memory thereof.

In the block 605, the computer 210 provides a communication certificate chain 300 stored by the computer 210, e.g., in response to a charging mechanism of the charging station 205 engaging the vehicle 105, as discussed above. The process 600 continues in a block 610.

In the block 610, the computer 210 determines whether a communication session has been established with the vehicle computer 110. The computer 210 can determine that the communication session is established, e.g., based on receiving communications from the vehicle computer 110 via the TLS protocol. If the communication session has been established, then the process 600 continues in a block 625. Otherwise, the process 600 continues in a block 615.

In the block 615, the computer 210 determines whether a specified number of tokens has been received, e.g., from a remote server computer 140, a user device 145, the vehicle computer 110, etc. As discussed above, the computer 210 can actuate a display on the charging station 205 specifying a number of tokens required to initiate the charging operation. A user can then authorize transfer of the tokens to the computer 210, e.g., based on a user input to the user device 145, as discussed above. If the computer 210 receives the specified number of tokens, then the process 600 continues in a block 645. Otherwise, the process 600 continues in a block 620.

In the block 620, the computer 210 prevents the vehicle 105 from accessing the charging station 205. That is, the computer 210 does not initiate the charging operation to recharge the vehicle 105 battery. The process 600 ends following the block 620.

In the block 625, the computer 210 determines whether an access certificate chain 400 has been received, e.g., from the vehicle computer 110 via the TLS protocol. If the access certificate chain 400 has been received, then the process 600 continues in a block 630. Otherwise, the process 600 remains in the block 625.

In the block 630, the computer 210 authenticates the received access certificate chain 400. The computer 210 can verify each certificate 405 in the received access certificate chain 400 according to the PKI, as discussed above. The computer 210 determines the issuer identifier 420*b* of the intermediate certificate 405*b* issued by the root certificate authority of the received access certificate chain 400, as discussed above. The computer 210 then compares the issuer identifier 420*b* of the intermediate certificate 405*b* issued by the root certificate authority of the received access certificate chain 400 to the issuer identifier 320*b* of the intermediate certificate 305*b* issued by the root certificate authority of the communication certificate chain 300, as discussed above. If the issuer identifier 420*b* of the intermediate certificate 405*b* issued by the root certificate authority of the root certificate 405*c* of the received access certificate chain 400 matches the issuer identifier 320*b* of the intermediate certificate 305*b* issued by the root certificate authority of the communication certificate chain 300, then the process 600 continues in a block 635. Otherwise, the process 600 continues in the block 620.

In the block 635, the computer 210 provides a subject identifier 410*a* to the remote server computer 140. The computer 210 can determine the subject identifier 410*a* from the end-user certificate 405*a* of the access certificate chain 400 authenticated in the block 630. The computer 210 can then transmit the subject identifier 410*a* to the remote server computer 140, as discussed above. The process 600 continues in a block 640.

In the block 640, the computer 210 determines whether authorization has been received. If the computer 210 receives, e.g., via the network 135, the authorization from the remote server computer 140, then the process 600 continues in a block 645. If the computer 210 receives, e.g., via the network 135, a cancellation from the remote server computer 140, the process 600 continues in the block 620.

In the block 645, the computer 210 initiates the charging operation. That is, the computer 210 communicates with the vehicle computer 110 to actuate components of the vehicle 105 and/or charging station 205 to transfer energy from the power source of the charging station 205 to the vehicle 105 battery. The process 600 ends following the block 645.

Figure 7:
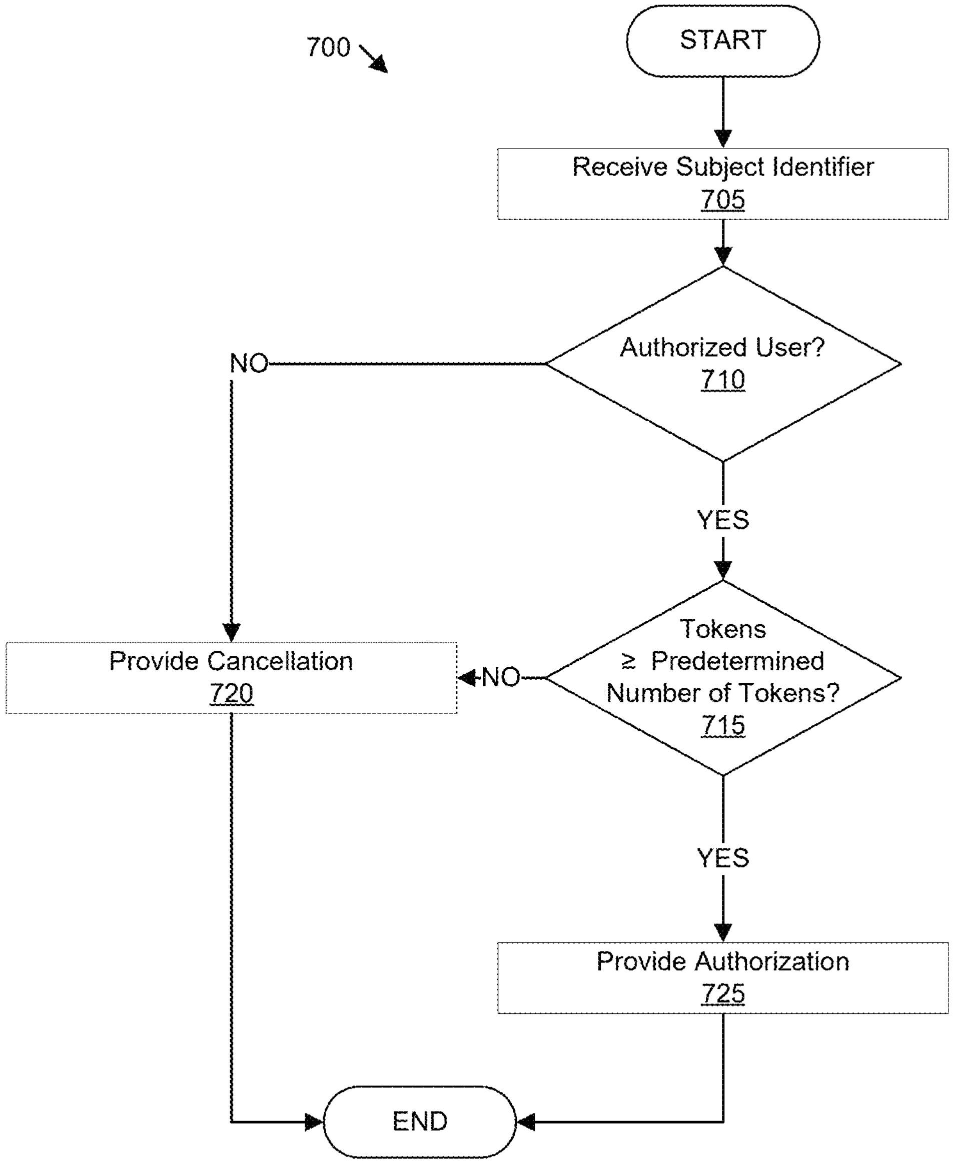
FIG. 7 is an example process for authorizing subject identifier.

FIG. 7 is a diagram of an example process 700 for authorizing a subject identifier 410*a*. The process 700 begins in a block 705. The process 700 can be carried out by a remote server computer 140 executing program instructions stored in a memory thereof.

In the block 705, the remote server computer 140 receives the subject identifier 410*a* from the computer 210, e.g., via the network 135. The process 700 continues in a block 710.

In the block 710, the remote server computer 140 determines whether a vehicle 105 is authorized or unauthorized based on the subject identifier 410*a*. For example, the remote server computer 140 can compare the received subject identifier 410*a* to a plurality of stored subject identifiers, e.g., maintained in a look-up table or the like, as discussed above. If the received subject identifier 410*a* matches one of the stored subject identifiers, then the process 700 continues in a block 715. Otherwise, the process 700 continues in a block 720.

In the block 720, the remote server computer 140 provides the cancellation to the computer 210, e.g., via a communication protocol. The cancellation instructs the computer 210 to not initiate the charging operation, as discussed above. The process 700 ends following the block 720.

In the block 715, the remote server computer 140 can determine whether an available number of tokens associated with the authorized vehicle 105 is greater than or equal to a predetermined number of tokens, as discussed above. If the available number of tokens associated with the authorized vehicle 105 is greater than or equal to the predetermined number of tokens, then the process 700 continues in a block 725. Otherwise, the process 700 continues in a block 720. Alternatively, the remote server computer 140 can request a number of tokens equal to a difference between the available tokens and the predetermined number of tokens be provided by the user device 145, as discussed above.

In the block 725, the remote server computer 140 provides the authorization to the computer 210, e.g., via a communication protocol. The authorization instructs the computer 210 to initiate the charging operation, as discussed above. The process 700 ends following the block 725.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:

a mobile computer including a processor and a memory, the memory storing instructions executable by the processor such that the mobile computer is programmed to:

upon requesting access to a terminal, receive a communication certificate chain from a terminal computer included in the terminal;

establish a communication session with the terminal computer based on an issuer identifier of a root certificate authority included in the communication certificate chain received from the terminal computer and matching a subject identifier of a stored root certificate;

upon establishing the communication session, determine, for each of a plurality of access certificate chains stored by the mobile computer, a respective issuer identifier of a respective root certificate authority in the corresponding access certificate chain;

upon determining that the respective issuer identifier in one access certificate chain matches the subject identifier of the stored root certificate that matched the issuer identifier included in the communication certificate chain, select, from among the plurality of access certificate chains stored by the mobile computer, the one access certificate chain; and transmit the selected access certificate chain to the terminal computer;

the system further comprising the terminal computer, including a second processor and a second memory storing instructions executable by the second processor such that the terminal computer is programmed to:

upon receiving the selected access certificate chain, authenticate the selected access certificate chain based on the respective issuer identifier included in the selected access certificate chain matching the issuer identifier of the root certificate authority in the communication certificate chain;

then, upon identifying a subject identifier from an end-user certificate in the selected access certificate chain, transmit the subject identifier to a third computer; and upon receiving authorization from the third computer, permit the mobile computer to access the terminal.

2. The system of claim 1, wherein the mobile computer is further programmed to, upon determining that the issuer identifier of the root certificate authority in the communication certificate chain does not match the subject identifier of the stored root certificate, prevent establishment of the communication session.

3. The system of claim 2, wherein the terminal computer is further programmed to, upon receiving authorization from a third computer, permit the mobile computer to access the terminal.

4. The system of claim 3, wherein the mobile computer is included in a vehicle, and the third computer is remote from the vehicle and the terminal.

5. The system of claim 3, further comprising the third computer, including a third processor and a third memory storing instructions executable by the third processor such that the remote computer is programmed to generate the authorization in response to receiving a specified number of tokens from a fourth computer.

6. The system of claim 1, wherein the mobile computer is included in a vehicle, and the third computer is remote from the vehicle and the terminal.

7. A method, comprising:

upon requesting access to a terminal, receiving, via a mobile computer, a communication certificate chain from a terminal computer included in the terminal;

establishing, via the mobile computer, a communication session with the terminal computer based on an issuer identifier of a root certificate authority included in the communication certificate chain received from the terminal computer and matching a subject identifier of a stored root certificate;

upon establishing the communication session, determining, for each of a plurality of access certificate chains stored by the mobile computer, a respective issuer identifier of a respective root certificate authority in the corresponding access certificate chain;

upon determining that the respective issuer identifier in one access certificate chain matches the subject identifier of the stored root certificate that matched the issuer identifier included in the communication certificate chain, selecting, from among the plurality of access certificate chains stored by the mobile computer, the one access certificate chain; and transmitting the selected access certificate chain from the mobile computer to the terminal computer;

upon receiving the selected access certificate chain in the terminal computer, authenticating, via the terminal computer, the selected access certificate chain based on the respective issuer identifier included in the selected access certificate chain matching the issuer identifier of the root certificate authority in the communication certificate chain;

then, upon identifying a subject identifier from an end-user certificate in the selected access chain, transmitting, via the terminal computer, the subject identifier to a third computer; and upon receiving authorization from the third computer, permitting, via the terminal computer, the mobile computer to access the terminal.

8. The method of claim 7, further comprising, upon determining that the issuer identifier of the root certificate authority in the communication certificate chain does not match the subject identifier of the stored root certificate, preventing, via the mobile computer, establishment of the communication session.

9. The method of claim 8, further comprising, upon receiving authorization from a third computer, permitting, via the terminal computer, the mobile computer to access the terminal.

10. The method of claim 9, wherein the mobile computer is included in a vehicle, and the third computer is remote from the vehicle and the terminal.

11. The method of claim 9, further comprising generating, via the third computer, the authorization in response to receiving a specified number of tokens from a fourth computer.

12. The method of claim 7, wherein the mobile computer is included in a vehicle, and the third computer is remote from the vehicle and the terminal.

13. The method of claim 7, further comprising:

upon determining that none of the issuer identifiers included in the respective access certificate chains match the subject identifier of the stored root certificate, determining, via the mobile computer, a respective subject identifier included in a respective end-user certificate for each of the access certificate chains;

comparing, via the mobile computer, each of the respective subject identifiers included in the respective end-user certificates to a subject identifier included in an intermediate certificate of the communication certificate chain, wherein the intermediate certificate is issued by a root certificate authority;

upon determining that the respective subject identifier in the respective end-user certificate of one access certificate chain matches the subject identifier in the intermediate certificate, selecting, via the mobile computer, the one access certificate chain; and transmitting, via the mobile computer, the selected access certificate chain to the terminal computer.

14. The method of claim 7, further comprising:

upon determining that at least two of the respective issuer identifiers included in the respective access certificate chains match the subject identifier of the stored root certificate, comparing, via the mobile computer, respective subject identifiers included in respective intermediate certificates of the respective access certificate chains to each other, wherein each of the intermediate certificates are issued by a respective root certificate authority in the respective access certificate chain;

upon determining that the respective subject identifiers included in the respective intermediate certificates match each other, determining, via the mobile computer, a respective subject identifier included in a respective end-user certificate for each of the corresponding access certificate chains including the at least two respective issuer identifiers;

comparing, via the mobile computer, each of the respective subject identifiers included in the respective end-user certificates to a subject identifier included in an intermediate certificate of the communication certificate chain, wherein the intermediate certificate is issued by a root certificate authority;

upon determining that the determined subject identifier in the end-user certificate of one access certificate chain matches the subject identifier in the intermediate certificate of the communication certificate chain, selecting, via the mobile computer, the one access certificate chain; and transmitting, via the mobile computer, the selected access certificate chain to the terminal computer.

15. The method of claim 14, further comprising:

upon determining that the at least two respective issuer identifiers do not match each other, determining, via the mobile computer, a subject identifier included in an intermediate certificate of the communication certificate chain, wherein the intermediate certificate is issued by a root certificate authority in the communication certificate chain;

comparing, via the mobile computer, respective subject identifiers included in respective intermediate certificates of the respective access certificate chains to the subject identifier included in the intermediate certificate of the communication certificate chain;

selecting, via the mobile computer, one of the access certificate chains based on the subject identifier included in the intermediate certificate of the corresponding access certificate chain matching the subject identifier included in the intermediate certificate of the communication certificate chain; and transmitting, via the mobile computer, the selected access certificate chain to the terminal computer.

16. A system, comprising:

a mobile computer including a processor and a memory, the memory storing instructions executable by the processor such that the mobile computer is programmed to:

upon requesting access to a terminal, receive a communication certificate chain from a terminal computer included in the terminal;

establish a communication session with the terminal computer based on an issuer identifier of a root certificate authority included in the communication certificate chain received from the terminal computer and matching a subject identifier of a stored root certificate;

upon establishing the communication session, determine, for each of a plurality of access certificate chains stored by the mobile computer, a respective issuer identifier of a respective root certificate authority in the corresponding access certificate chain;

upon determining that the respective issuer identifier in one access certificate chain matches the subject identifier of the stored root certificate that matched the issuer identifier included in the communication certificate chain, select as a selected access certificate chain, from among the plurality of access certificate chains stored by the mobile computer, the one access certificate chain whose respective issuer identifier matches the subject identifier of the stored root certificate that matched the issuer identifier included in the communication certificate chain;

upon determining that none of the respective issuer identifiers included in the respective access certificate chains match the subject identifier of the stored root certificate, determine, for each of the access certificate chains, a respective subject identifier included in a respective end- user certificate;

compare each of the respective subject identifiers included in the respective end-user certificates to a subject identifier included in an intermediate certificate of the communication certificate chain, wherein the intermediate certificate is issued by a root certificate authority;

upon determining that the respective subject identifier in the respective end-user certificate of one access certificate chain matches the subject identifier in the intermediate certificate, select as the selected access certificate chain the one access certificate chain whose respective subject identifier in the respective end-user certificate of one access certificate chain matches the subject identifier in the intermediate certificate; and transmit the selected access certificate chain to the terminal computer.

17. The system of claim 16, wherein the mobile computer is further programmed to, upon determining that the issuer identifier of the root certificate authority in the communication certificate chain does not match the subject identifier of the stored root certificate, prevent establishment of the communication session.

18. The system of claim 17, further comprising the terminal computer, including a second processor and a second memory storing instructions executable by the second processor such that the terminal computer is programmed to, upon receiving authorization from a third computer, permit the mobile computer to access the terminal.

19. The system of claim 18, wherein the mobile computer is included in a vehicle, and the third computer is remote from the vehicle and the terminal.

20. The system of claim 18, further comprising the third computer, including a third processor and a third memory storing instructions executable by the third processor such that the remote computer is programmed to generate the authorization in response to receiving a specified number of tokens from a fourth computer.

21. A system, comprising:

a mobile computer including a processor and a memory, the memory storing instructions executable by the processor such that the mobile computer is programmed to:

upon requesting access to a terminal, receive a communication certificate chain from a terminal computer included in the terminal;

establish a communication session with the terminal computer based on an issuer identifier of a root certificate authority included in the communication certificate chain received from the terminal computer and matching a subject identifier of a stored root certificate;

upon establishing the communication session, determine, for each of a plurality of access certificate chains stored by the mobile computer, a respective issuer identifier of a respective root certificate authority in the corresponding access certificate chain;

upon determining that the respective issuer identifier in one access certificate chain matches the subject identifier of the stored root certificate that matched the issuer identifier included in the communication certificate chain, select as a selected access certificate chain, from among the plurality of access certificate chains stored by the mobile computer, the one access certificate chain whose respective issuer identifier matches the subject identifier of the stored root certificate that matched the issuer identifier included in the communication certificate chain;

upon determining that at least two of the respective issuer identifiers included in the respective access certificate chains match the subject identifier of the stored root certificate, compare respective subject identifiers included in respective intermediate certificates of the respective access certificate chains to each other, wherein each of the intermediate certificates are issued by a respective root certificate authority in the respective access certificate chain;

upon determining that the respective subject identifiers included in the respective intermediate certificates match each other, determine, for each of the corresponding access certificate chains including the at least two respective issuer identifiers, a respective subject identifier included in a respective end-user certificate;

compare each of the respective subject identifiers included in the respective end-user certificates to a subject identifier included in an intermediate certificate of the communication certificate chain, wherein the intermediate certificate is issued by a root certificate authority;

upon determining that the subject identifier in the end-user certificate of one access certificate chain matches the subject identifier in the intermediate certificate of the communication certificate chain, select the one access certificate chain that matches the subject identifier in the intermediate certificate of the communication certificate chain as the selected access certificate chain; and transmit the selected access certificate chain to the terminal computer.

22. The system of claim 21, wherein the mobile computer is further programmed to:

upon determining that the at least two respective issuer identifiers do not match each other, determine a subject identifier included in an intermediate certificate of the communication certificate chain, wherein the intermediate certificate is issued by a root certificate authority in the communication certificate chain;

compare respective subject identifiers included in respective intermediate certificates of the respective access certificate chains to the subject identifier included in the intermediate certificate of the communication certificate chain; and select one of the access certificate chains as the selected access certificate chain based on the subject identifier included in the intermediate certificate of the corresponding access certificate chain matching the subject identifier included in the intermediate certificate of the communication certificate chain.

* * * * *